United States Patent
Schlotterbeck et al.

(10) Patent No.: US 10,732,279 B2
(45) Date of Patent: Aug. 4, 2020

(54) METHOD FOR IDENTIFYING A SOLID OBSTACLE IN A LASER BEAM OF A LIDAR SYSTEM AND RELATED SYSTEM

(71) Applicant: THALES, Courbevoie (FR)

(72) Inventors: Jean-Pierre Schlotterbeck, Valence (FR); Philippe Rondeau, Valence (FR)

(73) Assignee: THALES, Courbevoie (FR)

( * ) Notice: Subject to any disclaimer, the term of this patent is extended or adjusted under 35 U.S.C. 154(b) by 279 days.

(21) Appl. No.: 15/821,966

(22) Filed: Nov. 24, 2017

(65) Prior Publication Data

US 2018/0149747 A1 May 31, 2018

(30) Foreign Application Priority Data

Nov. 28, 2016 (FR) .................... 16 01679

(51) Int. Cl.
*G01C 3/08* (2006.01)
*G01S 17/04* (2020.01)
*G01S 7/497* (2006.01)
*G01S 7/48* (2006.01)
*G01S 17/58* (2006.01)
*G01P 3/36* (2006.01)
*G01S 7/481* (2006.01)

(52) U.S. Cl.
CPC ............ *G01S 17/04* (2020.01); *G01P 3/36* (2013.01); *G01S 7/4802* (2013.01); *G01S 7/4814* (2013.01); *G01S 7/497* (2013.01); *G01S 17/58* (2013.01)

(58) Field of Classification Search
CPC ........ G01P 3/36; G01S 7/4814; G01S 7/4802; G01S 7/497; G01S 17/026; G01S 17/58
USPC .............................................. 356/4.01
See application file for complete search history.

(56) References Cited

U.S. PATENT DOCUMENTS 8,576,382 B2 * 11/2013 LaValley ................. G01S 17/87
356/3.01
8,781,790 B2 * 7/2014 Zhu ........................ G01S 7/4802
702/159

(Continued)

FOREIGN PATENT DOCUMENTS

| EP | 1 749 219 A1 | 2/2007 |
| EP | 2 677 340 A1 | 12/2013 |
| WO | 2014/102175 A1 | 7/2014 |

OTHER PUBLICATIONS

FR Search Report, dated Aug. 17, 2017, from corresponding FR 1601679 Application.

*Primary Examiner* — Mark Hellner
(74) *Attorney, Agent, or Firm* — Young & Thompson

(57) ABSTRACT

A method for identifying an obstacle (O) in the laser beam (F) of a lidar system includes: commanding the transmission of a laser beam (F); and receiving a lidar signal (S) corresponding to the reflection of the beam (F) on a diffuser present in the beam (F). The detection method further includes: evaluating a set of first parameters of the lidar signal, the set of first parameters including at least an amplitude and a duration, a first detection moment being defined for the lidar signal (S), the duration being defined at each moment as the time elapsed since the first detection moment; identifying an obstacle (O) present in the beam (F) when the amplitude is greater than a first threshold and the duration is greater than a second threshold; and decreasing the power of the beam (F).

10 Claims, 2 Drawing Sheets

(56) References Cited

U.S. PATENT DOCUMENTS

2009/0219961 A1* 9/2009 Meyers .................. G01S 7/497
                                                    372/29.01
2009/0273770 A1* 11/2009 Bauhahn ................. G01C 3/08
                                                    356/5.01
2015/0323559 A1   11/2015 Rondeau et al.

* cited by examiner

METHOD FOR IDENTIFYING A SOLID OBSTACLE IN A LASER BEAM OF A LIDAR SYSTEM AND RELATED SYSTEM

FIELD OF THE INVENTION

The present invention relates to a method for identifying a solid obstacle in the laser beam of a lidar system. The present invention also relates to an associated system and platform.

BACKGROUND OF THE INVENTION

The present invention fits within the field of lidars. Remote sensing by laser or lidar (acronym for "light detection and ranging" or "laser detection and ranging") is a remote measuring technique based on the analysis of the properties of a beam of light returned toward its sender.

In particular, lidar systems are used to determine the speed of aircraft relative to the atmosphere. In this case, a laser beam is sent in the direction in which the aircraft is moving. The backscattering of the laser beam on the particles present in the atmosphere, for example dust or water droplets, generates a signal detected by the lidar system. Using Doppler effect analysis, it is then possible to determine the speed of the aircraft relative to the particles, and therefore relative to the ambient air.

For example, lidar systems are said to be "single-particle" when the laser beam is focused at a short distance from the emitter, over an area with a small volume. Thus, at aircraft cruising altitudes, few particles are present at the same time in the area in which the beam is focused. Such systems have high measurement availability.

However, the use of a laser beam is not without risks. In particular, the light beam, coherent and with a small diameter, has a high power, which may reach a watt or more. Consequently, an object placed in the beam may be seriously damaged. In particular, an operator crossing the beam, for example when the aircraft is on the ground, risks experiencing burns, in particular ocular.

These risks limit the use of such systems when an aircraft is on or near the ground, since the laser beam must then be cut by the pilot to avoid any burn risk. Additional systems are therefore necessary to measure the ground speed.

SUMMARY OF THE INVENTION

There is therefore a need for a lidar system that can be used by a platform on the ground.

To that end, proposed is a method for identifying a solid obstacle in the laser beam of a lidar system comprising the following steps:
commanding the transmission of a laser beam having a power, and
receiving a lidar signal corresponding to the reflection of the beam on at least one diffuser present in the beam.
The identification method further comprises the following steps:
evaluating a set of first parameters of the lidar signal, the set of first parameters including at least an amplitude and a duration, a first detection moment being defined for the lidar signal, the duration being defined at each moment as the time elapsed since the first detection moment,
identifying a solid obstacle present in the beam when the amplitude is greater than or equal to a first predetermined threshold and the duration is greater than or equal to a second predetermined threshold, and
after identifying a solid obstacle, commanding a decrease in the power of the emitted beam.

According to other advantageous, but optional aspects of the invention, the method comprises one or more of the following features, considered alone or according to all technically possible combinations:
the method further includes a calibration phase, the calibration phase comprising the following steps:
acquiring a plurality of reference lidar signals, each reference lidar signal corresponding to the reflection of the beam on at least one particle in suspension in the atmosphere,
distributing the reference lidar signals into a set of classes based on values of at least a first parameter of the reference lidar signals to obtain classes grouping together the reference lidar signals for which the first considered parameter has a shared value range,
estimating second parameters of a probability law describing the set of classes, and
calculating at least one threshold from among the first threshold and the second threshold from the estimated probability law.
the calculated threshold is such that the probability that the corresponding first parameter is greater than or equal to the calculated threshold is less than or equal to a predetermined quantity according to the estimated probability law.
the set of first parameters comprises a spectral width of the lidar signal, and the identification is validated only if the spectral width is less than or equal to a third predetermined threshold.
the reception step comprises the acquisition, by a photodetector, during a measuring window, of a set of values of an illumination intensity of the photodetector and the analysis of the acquired values to extract the lidar signal, the measuring window having a temporal width, the third predetermined threshold being a function of the temporal width of the measuring window.
the third predetermined threshold is equal to three halves of the inverse of the temporal width.
the decrease step comprises decreasing the power from a first value to a second value during a time range having a duration shorter than or equal to 1 millisecond.

Also proposed is a computer program product including software instructions which, when executed by a controller, carry out an identification method according to the invention.

Also proposed is a system comprising an electromagnetic wave emitter, a logic controller and a photodetector, the logic controller being configured to implement an identification method according to the invention.

Also proposed is a platform equipped with a system according to the invention.

BRIEF DESCRIPTION OF DRAWINGS

The features and advantages of the invention will appear upon reading the following description, provided solely as a non-limiting example, and done in reference to the appended drawings, in which.

DETAILED DESCRIPTION OF PREFERRED EMBODIMENTS

Figure 1:
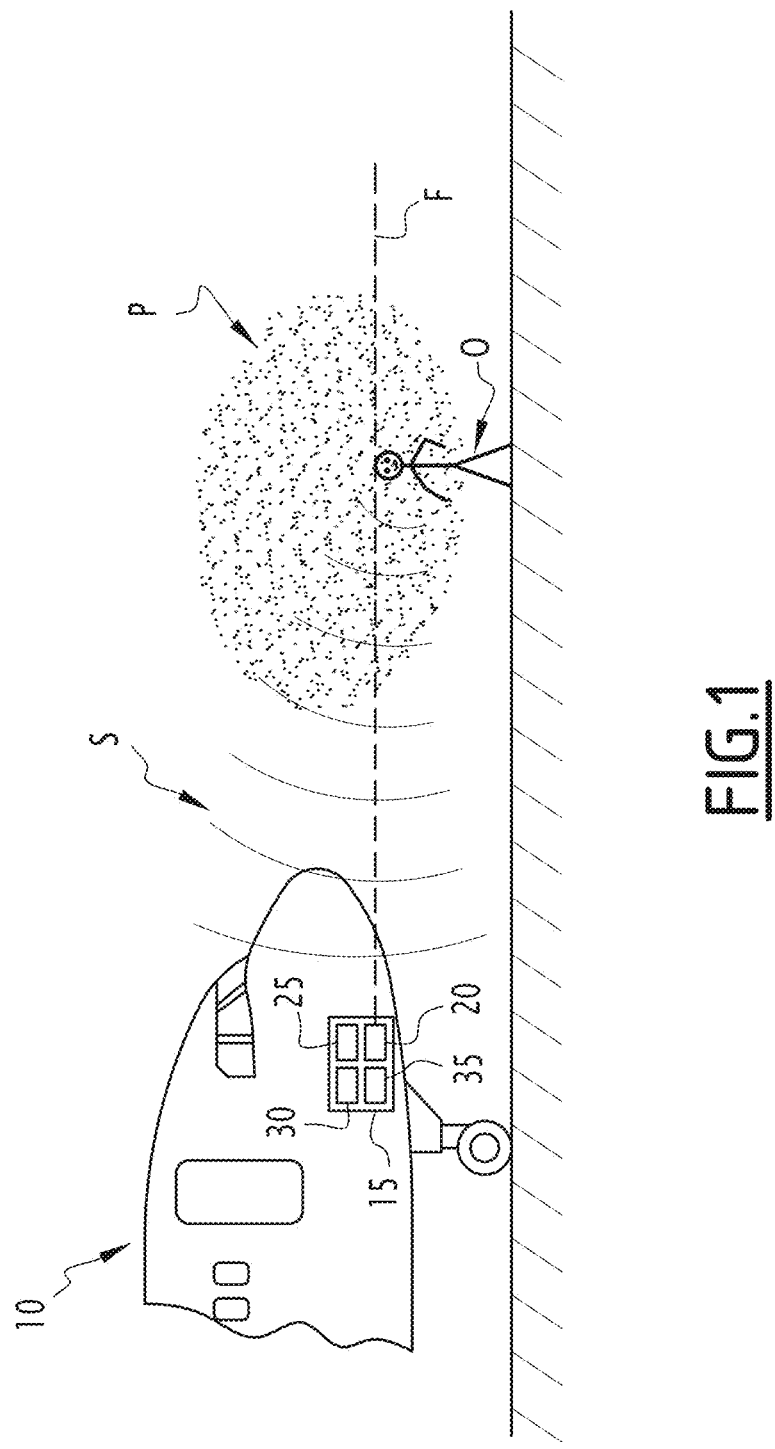
FIG. 1 is a schematic illustration of a platform equipped with a lidar system.

A platform 10 is shown in FIG. 1. The platform 10 is a moving platform, for example a vehicle.

In one embodiment, the platform 10 is an airborne platform, for example an aircraft. According to the example of FIG. 1, the platform 10 is an airplane.

Alternatively, the platform 10 is a land-based platform, such as a train.

The platform 10 includes a lidar system 15.

The system 15 is configured to measure a speed of the platform 10 relative to the atmosphere surrounding the platform 10.

The system 15 includes a emitter 20, a photodetector 25, a logic controller 30, a memory 35.

The emitter 20 is configured to emit a laser beam. A laser beam is a coherent optical beam.

The emitter 20 for example includes a laser diode.

According to one embodiment, the emitter 20 further includes an amplifier.

The laser beam F includes at least a first electromagnetic wave EM1. Each first electromagnetic wave EM1 has a first frequency f1.

The laser beam F is a monochromatic beam. "Monochromatic" means that all of the first electromagnetic waves EM1 have a same first frequency f1.

The first frequency f1 is constant in one embodiment, which means that it does not vary over time.

Alternatively, the laser beam F is a frequency-modulated beam, i.e., the first frequency f1 is not constant.

A power is defined for the laser beam F. The power can be modified by the emitter 20 between zero and a maximum value. The maximum value is for example equal to 10 W (watts).

The power of the emitted laser beam F is controlled by the logic controller 30, for example via a transmission power control command.

The emitter 20 is configured to focus the laser beam F on a predetermined area of the space. The area has a diameter, measured in a plane perpendicular to a propagation direction of the beam F, and a length, measured along the propagation direction.

According to one embodiment, a distance between the emitter 20 and the area is comprised between 10 centimeters (cm) and 1 meter. The diameter is comprised between 10 micrometers (μm) and 300 μm. The length is comprised between 5 mm and 10 cm. The system 15 is then said to be able to operate in "single-particle" mode.

Alternatively, the system 15 is able to operate in "multi-particle" mode, i.e., the area on which the beam F is focused is separated from the emitter 20 by a distance greater than or equal to 5 m.

The photodetector 25 is configured to detect at least one second electromagnetic wave. The photodetector 25 is further configured to measure an amplitude, called second amplitude, and a frequency, called second frequency, of each second electromagnetic wave EM2.

The photodetector 25 is for example a photodiode PIN or a pair of photodiodes making it possible to perform a balanced detection.

The logic controller 30 is configured to command the transmission of the laser beam F by the emitter 20.

The logic controller 30 is further configured to measure a speed of the platform 10 relative to the atmosphere from second electromagnetic waves EM2 detected by the photodetector 25.

The logic controller 30 is configured to carry out a method for identifying a solid obstacle in the laser beam F.

The logic controller 30 is for example a computer.

More generally, the logic controller 30 is an electronic logic controller able to manipulate and/or transform data represented as electronic or physical quantities in registers of the logic controller 30 and/or memories into other similar data corresponding to physical data in the memories, registers or other types of display, transmission or storage devices.

The logic controller 30 is for example a data processing unit comprising a memory and a processor.

It should be noted that other types of logic controller 30 can be used. For example, according to one alternative, the logic controller 30 is a programmable logic component. A programmable logic component, also called programmable logic circuit or programmable logic network, is an integrated logic circuit that can be reprogrammed after manufacturing. According to another alternative, it is an ASIC. An ASIC (Application-Specific Integrated Circuit) is a specialized integrated circuit dedicated to a specific application.

The logic controller 30 is able to interact with a computer program product.

The computer program product includes a readable information medium, on which a program is stored comprising program instructions able to carry out the identification method when the program is executed by the logic controller 30.

A readable information medium is a medium readable by the logic controller 30, for example an optical disc, a CD-ROM, a magnetic-optical disc, a ROM memory, a RAM memory, an EPROM memory, an EEPROM memory, a magnetic card or an optical card.

Figure 2:
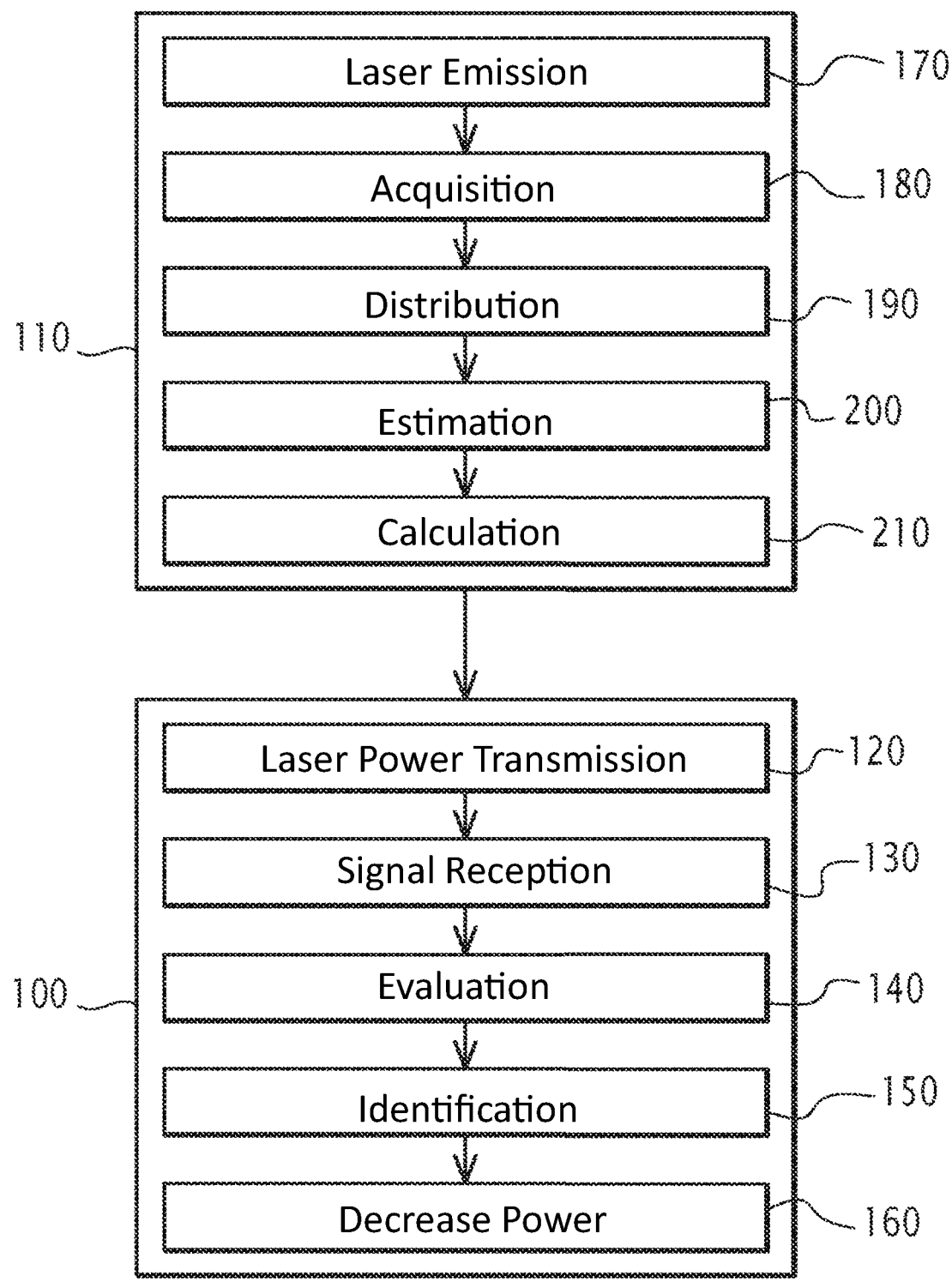
FIG. 2 is a flowchart of the steps of a method for identifying a solid obstacle, carried out by the lidar system of FIG. 1.

The operation of the system 15 is now described in reference to the implementation of an example method for identifying a solid obstacle in a laser beam F, in particular illustrated by FIG. 2.

The method includes an identification phase 100 and a calibration phase 110.

During the identification phase, the platform 10 is on the ground. For example, the platform 10 is moving on the tarmac of an airport.

The identification phase 100 includes a first step 120 for commanding transmission, a receiving step 130, an evaluation step 140, an identification step 150, and a decrease step 160.

During the first step for commanding transmission 120, the logic controller 30 commands the transmission of the laser beam F by the emitter 20.

For example, if the laser beam F is not emitted before the first step for commanding transmission 120, the logic controller 30 commands the power supply of the emitter 20.

If the laser beam F is emitted before the first step for commanding transmission 120, the logic component sets the power of the laser beam F at a predetermined value.

The power has a first value. The first value is for example comprised between 100 mW and 10 mW.

The first value is a nominal operating value of the system 15, i.e., the first value is a value for which the system 15 is able to measure the speed of the platform 10 under normal operating circumstances. For example, the first value is adapted to measure the speed of the platform 10 when the platform 10 is in flight at its cruising speed.

Preferably, the transmission is continuous during the receiving 130, evaluation 140 and identification 150 steps. In particular, the power of the laser beam is not modified during the receiving 130, evaluation 140 and identification 150 steps.

During the receiving step 130, at least one diffuser is present in the laser beam F. In particular, at least one diffuser is present in the area on which the laser beam F is focused.

"Diffuser" refers to an element able to reflect or diffuse the laser beam F.

A particle P is for example a diffuser particle. For example, during the reception step 130, a set of particles P is in suspension in the atmosphere around the platform 10, and at least one particle P is present in the laser beam F. For example, at least one particle is in motion in the laser beam F.

Each particle P is for example a speck of dust, or a water droplet, or a snowflake, or a piece of hail.

At least one diffuser is an obstacle O. The obstacle O is a solid obstacle.

"Solid obstacle" means that the obstacle O is not a particle.

The obstacle O has at least one dimension greater than or equal to 10 cm.

The obstacle O is not a speck of dust, or a water droplet, or a snowflake, or a hailstone.

The obstacle O is for example an object placed on the ground. According to the example of FIG. 1, the obstacle O is an operator.

At least one lidar signal is received by the photodetector 25. For example, the photodetector 25 receives a first lidar signal S1 and a set of second lidar signals S2.

In particular, the photodetector 25 receives a set of second electromagnetic waves EM2, each lidar signal S1, S2 being made up of a group of second electromagnetic waves having characteristics close to one another. For example, each lidar signal S1, S2 has two extreme frequencies, the second frequency of each second electromagnetic wave of the considered lidar signal being comprised between the two extreme frequencies.

The reception of the lidar signals S1, S2 has been shown symbolically in FIG. 1 by a set S of second electromagnetic waves.

Each lidar signal S1, S2 corresponds to the reflection of the laser beam F on a diffuser.

The first lidar signal S1 corresponds to the reflection of the laser beam F on the obstacle O.

Each second lidar signal S2 corresponds to the reflection of the laser beam F on a particle P present in the beam F.

Each lidar signal S1, S2 is characterized by a set of first parameters. The set of first parameters includes an amplitude of the lidar signal S1, S2, a central frequency of the lidar signal S1, S2, a spectral width of the lidar signal S1, S2 and a duration.

The receiving step 130 comprises the acquisition, by the photodetector 25, of a set of property values relative to the first lidar signal S1.

For example, the transmission command of the laser beam F is emitted, by the logic controller 30, simultaneously with an acquisition command, by the photodetector 25, of values of the corresponding properties. In particular, the acquisition is done periodically from the acquisition command and until the lidar system is powered off.

A property is for example an illumination intensity of the photodetector 25.

Another property is a frequency of a second electromagnetic wave EM2 illuminating the photodetector 25.

For example, the photodetector 25 generates an electrical signal proportional to the amplitude of the first lidar signal S1. In this case, the frequency is measured by using a discrete Fourier transform of the electrical signal. The values are acquired by the photodetector 25 during a measuring window.

The measuring window has a temporal width. The temporal width Lt is the length of time elapsed between the moment associated with the first value acquired during the measuring window and the moment associated with the last value acquired during the measuring window.

The temporal width Lt is for example equal to 1 microsecond (µs).

Each measuring window has an overlap with at least one other measuring window. "Has an overlap" means that at least one value belonging to a measuring window also belongs to another measuring window.

Preferably, each value measured by the photodetector 25 belongs to at least two separate measuring windows.

The values acquired during the measuring window Fm are analyzed by the computer 30 to extract the lidar signals S1, S2. In particular, the first and second lidar signals S1, S2 are extracted.

During the evaluation step 140, the set of first parameters of each lidar signal S1, S2 is evaluated by the computer 30.

For example, the amplitude of each lidar signal S1, S2 is evaluated from illumination intensity values of the photodetector 25.

The central frequency of the lidar signal S1, S2 is the frequency associated with the greatest amplitude.

The spectral width of the lidar signal S1, S2 is calculated, by the logic controller 30, as being equal to the difference between the second extreme frequencies of the lidar signal S1, S2. The spectral width and the central frequency are for example evaluated from a fitting of a predefined function to the lidar signal. The predefined function is for example a Gaussian function.

The duration is defined, at each moment, as being equal to the time elapsed since a first detection moment of the lidar signal S1, S2.

The first detection moment is defined as being the moment before which the lidar signal S1, S2 is not detected. Before the first detection moment, the photodetector 25 does not detect a second electromagnetic wave EM2 having a frequency equal to the central frequency of the considered lidar signal S1, S2.

The first detection moment is for example a beginning moment of the time window during which the lidar signal S1, S2 is detected for the first time.

During the identification step 150, the amplitude of each lidar signal S1, S2 is compared to a first predetermined threshold s1. Furthermore, the duration of each lidar signal S1, S2 is compared to a second predetermined threshold s2.

If the amplitude is greater than or equal to the first threshold s1 and the duration is greater than or equal to the second threshold s2, the logic controller 30 identifies the solid obstacle O. "Identifies" means that the logic component attributes the lidar signal S1, S2 to a solid obstacle O and not to a particle P.

In the given example, the amplitude of the first lidar signal S1 is greater than or equal to the first threshold s1 and the duration of the first lidar signal S1 is greater than or equal to the second threshold s2. On the contrary, at least a first parameter among the amplitude A and the duration of each second lidar signal S2 is strictly lower than the first threshold s1 or the second threshold s2, respectively. Indeed, the particles P, due to their small dimensions, have a very short residence time in the beam F and have a very small interaction surface with the beam F.

Thus, in the given example, the logic controller 30 identifies the first lidar signal S1 as coming from a solid obstacle. The logic component therefore identifies the presence of the solid obstacle O in the beam F.

The logic controller 30 further identifies the second lidar signal S2 as coming from particles P.

The second threshold s2 is less than or equal to 50 milliseconds. For example, the second threshold s2 is equal to one millisecond.

At least one from among the first threshold s1 and the second threshold s2 are calculated by the logic controller 30.

For example, the first threshold s1 is computed by the logic controller 30 during the calibration phase, while the second threshold s2 is stored in the memory 35, and read in this memory during the identification step 150.

According to one embodiment, additionally, the spectral width of each lidar signal S1, S2 is compared to a third predetermined threshold s3.

In this embodiment, the identification is validated only if the spectral width of the lidar signal S1, S2 is less than or equal to the third threshold s3. Thus, the obstacle O is identified if the amplitude of a lidar signal S1, S2 is greater than or equal to the first threshold s1, the duration is greater than or equal to the second threshold s2, and the spectral width is less than or equal to the third threshold s3.

If, for a lidar signal S1, S2, the amplitude is greater than or equal to the first threshold s1 and the duration is greater than or equal to the second threshold s2, but the frequency width is strictly greater than the third threshold s3, the obstacle O is not identified.

The third threshold s3 is a function of the temporal width Lt of the measuring window. For example, the third threshold s3 is inversely proportional to the temporal width Lt.

According to one embodiment, the third threshold s3 is equal to the product of a number α and the inverse of the temporal width Lt. This is written mathematically as:

$$s3 = \alpha \times \frac{1}{Lt} \quad \text{(equation 1)}$$

in which x is the symbol for multiplication.

This number α is comprised between 1 and 4.

The number α is for example equal to 1.5.

In the given example, the spectral width of the first lidar signal S1 is less than or equal to the third threshold s3. Thus, the identification of the obstacle O is validated by the logic controller 30.

Furthermore, the logic controller 30 calculates, from first parameters of the second lidar signals S2, a speed of the platform relative to the atmosphere.

When the obstacle O has been identified during the identification step 150, the identification step 150 is followed by the decrease step 160.

During the decrease step 160, following the identification of the obstacle O, the logic controller 30 commands a decrease in the power of the emitted laser beam. In particular, the logic controller 30 commands a modification of the power between the first value v1 and a second value v2. The second value v2 is strictly lower than the first value v1.

The second value v2 is strictly greater than zero. For example, the second value v2 is such that the power received by a surface illuminated by the laser beam F is equal to 1 kilowatt per square meter.

For example, the power of the laser beam F decreases to reach the second value v2 during a time range having a duration shorter than or equal to 1 millisecond (ms).

Alternatively, the second value v2 is equal to zero, i.e., the laser beam F is cut.

The first transmission command step 120, the receiving step 130, the evaluation step 140, the identification step 150 and the decrease step 160 are reiterated in this order with a temporal period.

When the first transmission command step 120 is reiterated, the power of the laser beam F is kept at the second value v2 if the obstacle O has been identified during the previous iteration.

The temporal period is strictly less than the temporal width Lt of the measuring windows.

If the obstacle O is not identified during the identification step 150, the identification step 150 is not followed by the decrease step 160.

It should be noted that the acquisition of values by the photodetector 25 and the transmission of the laser beam F are not interrupted during the iteration, but are continually done over the course of the first transmission command step 120, the receiving step 130, the evaluation step 140, the identification step 150 and the decrease step 160.

If the obstacle O is not identified during the identification step 150 of the previous iteration, the power of the laser beam F is set at the first value v1 by the logic controller 30 during the transmission command step 120.

The first transmission command step 120, the receiving step 130, the evaluation step 140 and the identification step 150 are reiterated in this order with the temporal period.

During the calibration phase 110, at least one threshold from among the first threshold s1, the second threshold s2 and the third threshold s3 is calculated. For example, at least one threshold from among the first threshold s1 and the second threshold s2 is calculated.

According to one embodiment, at least one threshold from among the first threshold s1 and the second threshold s2 is not calculated by the logic component. The threshold s1, s2 that is not calculated is stored in the memory 35.

The calibration phase 110 is preferably carried out before the identification phase 100.

The calibration phase 110 includes a second transmission step 170, an acquisition step 180, a distribution step 190, an estimating step 200 and a calculating step 210.

During the second transmission step 170, the laser beam F is emitted.

During the acquisition step 180, no solid obstacle O is present in the beam F. In particular, no solid obstacle O is present in the area on which the laser beam F is focused.

For example, when the calibration phase 110 is carried out, barriers are placed or instructions are given to prevent an operator O from crossing the beam F.

During the acquisition step 180, at least one particle P is present in the laser beam F.

A plurality of lidar signals, called reference lidar signals SR, are then acquired.

Each reference lidar signal SR corresponds to the reflection of the laser beam F on at least one particle P.

During the distribution step 190, the reference lidar signals are distributed in at least one set of classes.

The distribution is done as a function of the values of at least a first parameter of the reference lidar signals SR. Classes C are thus obtained grouping together the reference lidar signals SR for which the first considered parameter has a common value range.

For example, the classes C group together reference lidar signals SR for which a set of first parameters have shared value ranges. According to one embodiment, at least one class $C_1$ groups together reference lidar signals SR for which the two first parameters have shared value ranges.

For example, classes $C_2$ group together reference lidar signals SR having substantially a same amplitude. Other classes $C_3$ group together reference lidar signals SR having a same central frequency. Other classes $C_4$ group together reference lidar signals SR having a same spectral width.

During the estimating step 200, second parameters of at least one probability law L are estimated.

Each probability law L is a law describing at least one set of classes. The probability law L describes a set of classes each grouping together reference lidar signals SR for which a first parameter has a shared value range.

For example, a probability law L describes the probability that a reference lidar signal SR has a certain amplitude value.

Other probability laws L describe the probability that a reference lidar signal SR has a certain central frequency, or a certain spectral width.

The normal law is an example of a probability law L. In probability theory and in statistics, the normal law is one of the most appropriate probability laws to model natural phenomena derived from several random events. The normal law is also called the Gauss law, or Gaussian law.

In one embodiment, the normal law is used for each considered set of classes.

According to another embodiment, an exponential law is used for at least one set of classes.

According to another embodiment, a gamma law is used for at least one set of classes. Gamma laws are a set of probability laws frequently used in statistics. Each probability law L has two parameters.

The expected value, the variance and the standard deviation are examples of second parameters.

Each second parameter is estimated from at least one set of classes. For example, a fitting of the probability law L to a set of classes is done.

During the calculating step 210, at least one threshold s1, s2, s3 is calculated. For example, at least one from among the first threshold s1 and the second threshold s2 is calculated.

The calculated threshold s1, s2, s3 is such that the probability that the corresponding first parameter is greater than or equal to the calculated threshold s1, s2, s3 is less than or equal to a predetermined quantity according to the corresponding probability law L.

"Quantity" refers to a real number strictly greater than zero, and less than 1.

For example, the calculated threshold s1, s2, s3 is such that the probability that the corresponding first parameter is greater than or equal to the calculated threshold s1, s2, s3 is less than or equal to one one-thousandth.

Each calculated threshold s1, s2, s3 is stored in the memory 35.

Advantageously, owing to the invention, an obstacle O is effectively identified. The logic controller 30 is then able to adapt the power of the laser beam F so as not to damage an object or injure an operator crossing the beam F.

The system 15 is then safer.

The system 15 is therefore able to be used for a land-based platform 10.

It is also possible to use the system 15, when it is mounted on an airborne platform 10, when the platform 10 is on the ground. The platform 10 then does not require additional speed measuring systems, or the number of redundant speed measuring systems is limited, since the system 15 does not assume providing specific speed measuring systems used when the platform 10 is on the ground.

Furthermore, owing to the invention, the beam F is not necessarily cut when an obstacle O is identified. The system 10 is also able to measure the speed of the platform 10 relative to the ambient atmosphere, albeit with lower precision.

Furthermore, because the beam F is not cut, the system 10 then identifies not only the appearance of the obstacle O in the beam F, but also the disappearance of the obstacle O, i.e., the exit of the obstacle O from the beam. Thus, the logic controller 30 returns the power to its nominal operating value once the obstacle O has disappeared. The availability of the system 15 is therefore improved.

Furthermore, the comparison of the spectral width to the third threshold s3 advantageously allows greater precision of the identification.

Indeed, in some cases such as thick fog or heavy snow, a second signal S2 may have a high amplitude and a long duration. However, the second signal S2 then comes from a large number of separate particles P each having their own speed while the first signal S1 comes from a same target having a single speed.

The second signal S2 then has a spectral width greater than the first signal S1. The comparison of each lidar signal S1, S2 to the third threshold s3 therefore makes it possible to distinguish a solid obstacle O from dense particles P.

Furthermore, the identification method described above can be implemented easily on a wide variety of systems 15. In particular, the identification method is able to be carried out by an existing system, without hardware modification, only software modifications being needed.

The system 15 has been described above in an example of a system 15 for measuring a speed of a platform. However, it will be obvious for one skilled in the art that the invention is applicable to other lidar systems.

According to one embodiment, the chirp of each lidar signal S1, S2 is compared to a fourth threshold s4.

"Chirp" refers to a temporal variation of the central frequency of the considered signal S1, S2. In particular, when a particle P traverses the laser beam F, the central frequency depends on the movement direction of the particle P relative to the wave front of the laser beam F. The central frequency therefore evolves as the particle P passes in the laser beam due to the curvature of the wave fronts. The obstacle O being large relative to the particles P, the chirp associated with the obstacle O is very small relative to the chirp associated with a particle P, or even zero.

The chirp is for example equal to the difference between the central frequency calculated during an iteration of the evaluation step 140 and the central frequency calculated during the following iteration of the evaluation step 140.

According to one embodiment, the chirp is calculated from central frequencies calculated during a set of iterations of the evaluation step 140. The set of iterations for example covers, in total, a temporal duration comprised between 1 µs and 10 µs.

The identification is not confirmed if the chirp is greater than or equal to the fourth threshold s4. The fourth threshold s4 is for example equal to 1 megahertz per microsecond (MHz/µs).

The invention claimed is:

1. A method for identifying a solid obstacle in a laser beam of a LIDAR system, comprising the following steps:

commanding a transmission of a laser beam having a power;

receiving a LIDAR signal corresponding to a reflection of the beam on at least one diffuser present in the beam;

evaluating a set of first parameters of the LIDAR signal, the set of first parameters including at least an amplitude and a duration, a first detection moment being defined for the LIDAR signal, the duration being defined at each moment as time elapsed since the first detection moment;

identifying a solid obstacle present in the beam when the amplitude is greater than or equal to a first predetermined threshold and the duration is greater than or equal to a second predetermined threshold; and after identifying a solid obstacle, commanding a decrease in the power of the emitted beam.

2. The identification method according to claim 1, further comprising a calibration phase, the calibration phase comprising the following steps:

acquiring a plurality of reference LIDAR signals, each reference LIDAR signal corresponding to the reflection of the beam on at least one particle in suspension in the atmosphere, no solid obstacle being present in the beam during the acquisition step;

distributing the reference LIDAR signals into a set of classes based on values of at least a first parameter of the reference LIDAR signals to obtain classes grouping together the reference LIDAR signals for which the first considered parameter has a shared value range;

estimating second parameters of a probability law describing the set of classes; and calculating at least one threshold from among the first threshold and the second threshold from the estimated probability law.

3. The identification method according to claim 2, wherein the calculated threshold is such that the probability that the corresponding first parameter is greater than or equal to the calculated threshold is less than or equal to a predetermined quantity according to the estimated probability law.

4. The identification method according to claim 1, wherein the set of first parameters further includes a spectral width of the LIDAR signal, and the identification is validated only if the spectral width is less than or equal to a third predetermined threshold.

5. The identification method according to claim 4, wherein the step of receiving the LIDAR signal comprises acquisition, by a photodetector, during a measuring window, of a set of values of an illumination intensity of the photodetector and analysis of the acquired set of values to extract the LIDAR signal, the measuring window having a temporal width, the third predetermined threshold being a function of the temporal width of the measuring window.

6. The identification method according to claim 5, wherein the third predetermined threshold is equal to three halves of the inverse of the temporal width.

7. The identification method according to claim 1, wherein the commanding the decrease in power comprises decreasing the power from a first value to a second value during a time range having a duration shorter than or equal to 1 millisecond.

8. A non-transitory storage medium having software instructions stored thereon which, when executed by a controller, carry out an identification method according to claim 1.

9. A system comprising an electromagnetic wave emitter, a logic controller and a photodetector, the logic controller being configured to implement the method according to claim 1.

10. A platform equipped with the system according to claim 9.

* * * * *